United States Patent [19]

Shimbara

[11] Patent Number: 4,542,810
[45] Date of Patent: Sep. 24, 1985

[54] DAMPER DEVICE

[75] Inventor: Sakuzo Shimbara, Hiroshima, Japan

[73] Assignee: Nifco Ind., Yokohama, Japan

[21] Appl. No.: 543,560

[22] Filed: Oct. 19, 1983

[30] Foreign Application Priority Data

Oct. 19, 1982 [JP] Japan .................. 57-182055

[51] Int. Cl.$^4$ .............................................. F16F 15/20
[52] U.S. Cl. ..................... 188/290; 360/93; 74/422
[58] Field of Search ............. 188/290, 291, 292, 293, 188/294, 295, 296, 41, 82.1, 82.2, 82.3, 82.34, 82.4, 82.7; 267/136, 137, 8 R; 312/333, 10; 74/422, 89.17; 271/164; 221/16; 360/93, 90, 132, 134

[56] References Cited

U.S. PATENT DOCUMENTS

| | | | |
|---|---|---|---|
| 3,813,953 | 6/1974 | Wojtowicz | 74/89.17 |
| 4,107,747 | 8/1978 | Kumaki | 360/93 |
| 4,202,021 | 5/1980 | Nagase et al. | 360/93 |
| 4,295,169 | 10/1981 | Iwata et al. | 360/93 |
| 4,426,752 | 1/1984 | Nakayama | 188/290 |

FOREIGN PATENT DOCUMENTS

0008604 ·1/1982 Japan .

Primary Examiner—Duane A. Reger
Assistant Examiner—Alvin Oberley
Attorney, Agent, or Firm—J. R. Halversen; T. W. Buckman

[57] ABSTRACT

A damper device comprises a slider capable of reciprocating along a rail, a rack gear disposed parallelly to the rail, and a damper swingably retained on the slider and provided with a toothed wheel adapted to be meshed with the aforementioned rack gear. This damper device, when the slider moves in one direction and push the damper from behind, enables the toothed wheel to be brought into engagement with the rack gear and, when the slider moves in the opposite direction, releases the toothed wheel from engagement with the rack gear.

7 Claims, 9 Drawing Figures

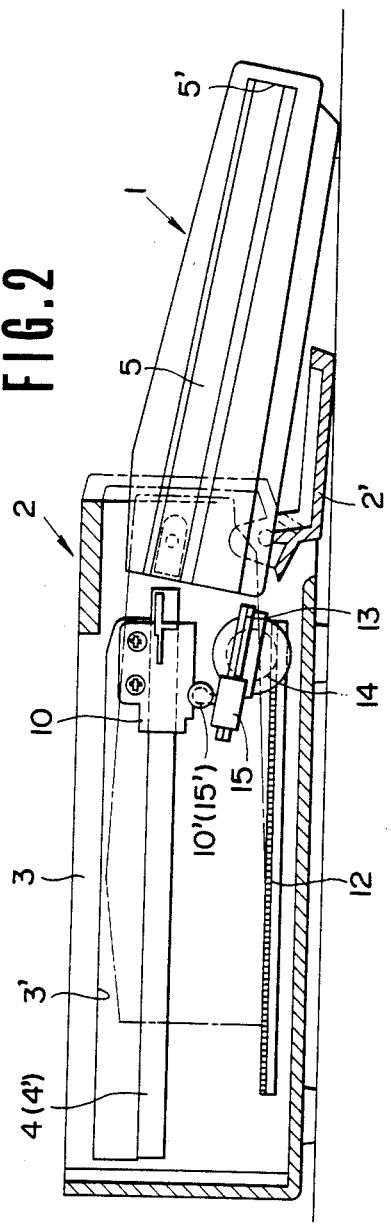
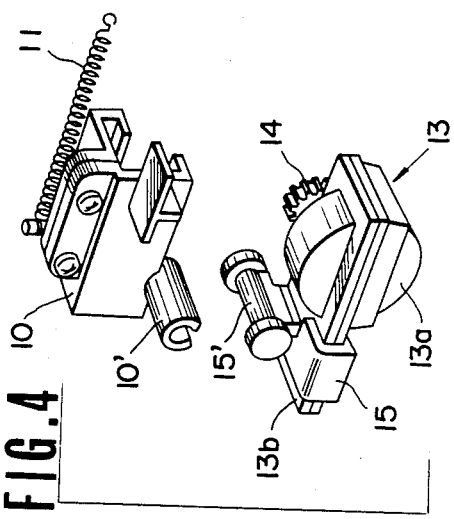
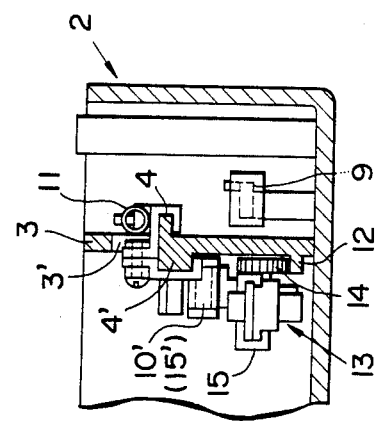

DAMPER DEVICE

BACKGROUND OF THE INVENTION

This invention relates to a damper device, and more particularly to a damper device adapted to control the reciprocation of sliders along rails so that, when the sliders move in one direction, the damper absorbs the motion of the sliders and causes the sliders to move at a reduced speed and, when the sliders move in the other direction, the damper is inactivated in order for the sliders to enjoy perfect freedom of motion.

In a cassette tape recorder, for example, a lid for the cassette insertion portion is suddenly opened by pushing a button for ejection and, upon completion of its opening, allowed to vibrate because the spring force is exerted directly on the lid. These phenomena are not desirable. In a radio cassette (a radio and cassette tape recorder combination built as a single unit) wherein a precision instrument such as an electronic keyboard musical instrument connected by a cord to the cassette tape recorder is stored within the housing of the radio cassette after the manner of a drawer in a cabinet, it is desirable that the precision instrument be gently urged out of the housing at a low speed when it is desired to be withdrawn and played. In view of the above, there has been proposed a damper device capable of gently opening a lid and enabling a precision instrument to be slowly pushed out of a case body as disclosed in Japanese Utility Model Public Disclosure No. Sho 57(1982)-8604. However, since this damper device acts on the lid or the precision instrument even at the time the lid is being closed or the instrument is being stored, it is impossible to carry out the closing or storing operation easily with small force.

SUMMARY OF THE INVENTION

The object of this invention is to provide a damper device for use with a housing for accommodating a box such that, during the removal of the box from the housing, the damper causes the box to be gently pushed out at a reduced speed and, during the insertion of the box into the housing, the damper permits the box to be pushed in at a high speed with minimal force.

To attain the object described above, the damper device of this invention comprises sliders capable of being reciprocated along rails, rack gears disposed parallelly with the rails, a damper swingably retained on the sliders and provided with toothed gears to be engaged with the aforementioned rack gears, and means for bringing the toothed wheels into engagement with the rack gears when the sliders push the damper forward in one direction and releasing the toothed wheels from the engagement with the rack gears when the sliders move in the other direction.

Thus, during the removal of the box from the housing, the box is caused to be pulled out at a reduced speed. During the insertion of the box into the housing, since the damper is inactivated, the box is allowed to be readily pushed into the housing with minimum force.

The other objects and the other characteristics of this invention will become apparent to those of ordinary skill in the art as the further disclosure is made in the following description with reference to the accompanying drawings.

BRIEF DESCRIPTION OF THE DRAWINGS

FIG. 2 is a side view of the damper device of FIG. 1

FIG. 3 is an enlarged longitudinal cross-sectional view illustrating the essential part of the damper device of FIG. 1.

FIG. 4 is a perspective view illustrating the essential part of the damper device of FIG. 1 in a disassembled state.

DESCRIPTION OF PREFERRED EMBODIMENTS

Figure 1:
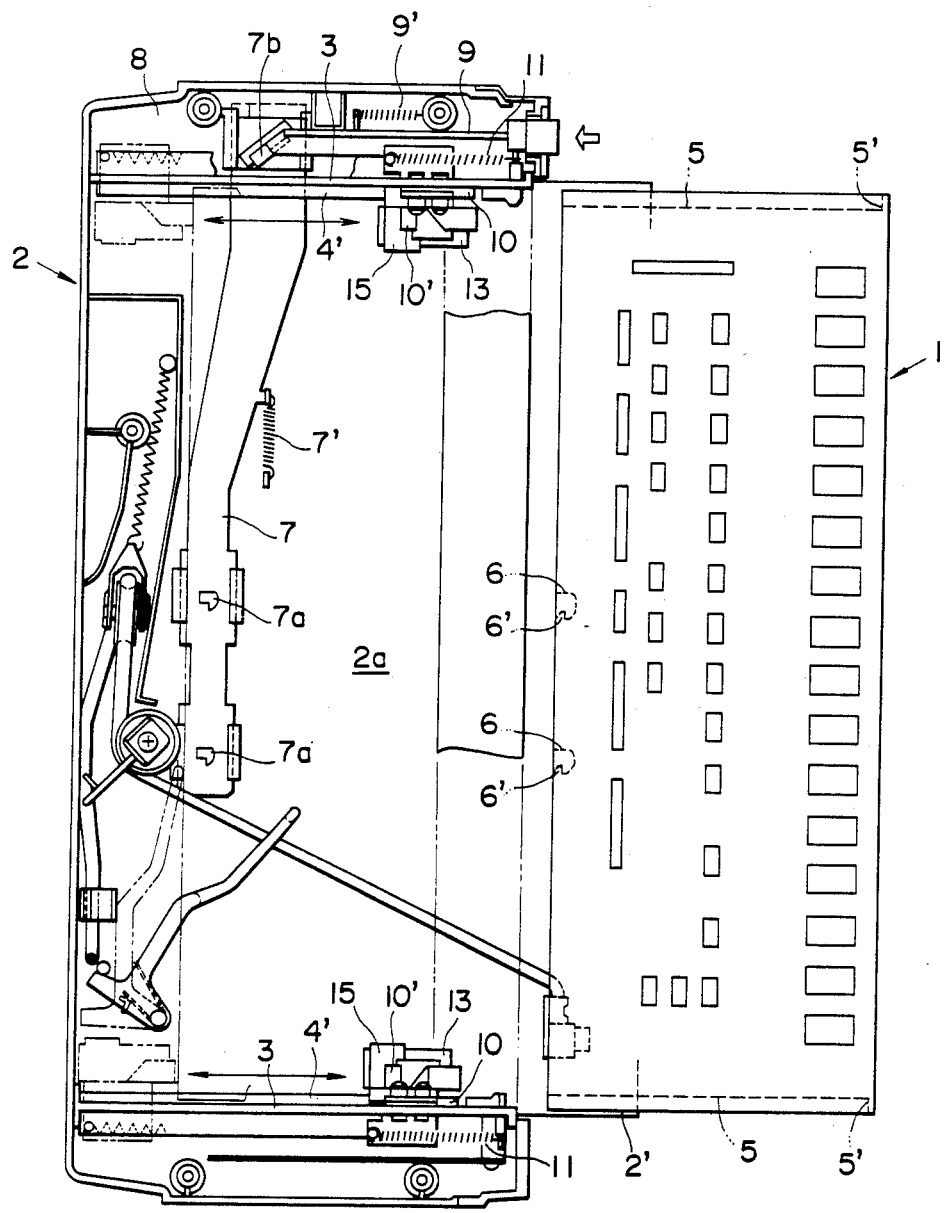
FIG. 1 is a plan view illustrating a damper device as the first embodiment of this invention.

FIGS. 1–4 represent the first embodiment of this invention, i.e. the damper device utilized for controlling the insertion and withdrawal of a unit case, e.g. an electronic keyboard musical instrument, into and out of the housing of a radio cassette after the manner of a drawer in a cabinet. In FIG. 1, 1 denotes a unit case and 2 a housing. The housing 2 is provided in the interior thereof with laterally opposed parallel side partition walls 3 defining a storage part 2a for admitting the unit case 1. The storage part or chamber 2a which is closed on three sides and is open at the front side. The open portion of the chamber 2a is adapted so that a door 2' may be erected therein to close the open side of the storage part 2a.

The lateral partition or opposed side walls 3 are each provided in the upper half portion thereof with a window hole 3' extending substantially throughout the entire length of the partition wall. The lower edges of the window holes are each formed in the shape of a side rail 4 having a cross section of the letter T. The inwardly projected parts 4' of the side rails 4 protruding from the opposed inner surfaces of the lateral partition walls fit into the lateral grooves 5 formed in the laterally opposite sides of the unit case 1 so as to support the unit case slidably in the forward and rearward directions with case 1 slightly spaced from the bottom of the housing. The leading ends 5' of the lateral grooves 5 of the unit case are so adapted that they collide against the leading ends of the inwardly projected parts 4' of the rails (adjacent the open side of chamber 2a) when the unit case is pushed in farthest inside the chamber 2a. Consequently, the unit case is brought into the state of storage allowing no further advance (as indicated by the chain line in FIGS. 1–2).

The unit case 1 is provided in the rear part on the lower side thereof with an engaging recess 6 of the shape of the letter L which opens at a cam part 6' into the rear side of the case. In the rear portion of the bottom plate of the housing 2, an engaging plate 7 is attached slidably in the lateral direction and is drawn by a spring 7' in one direction. The engaging plate 7 is provided at one end thereof with a protuberance 7a adapted to thrust into the engaging recess 6. When the unit case 1 is pushed into the housing 2 as described above, the cam part 6' of the engaging recess collides against the protuberance 7a and moves the engaging plate to the left or right against the resilience of the spring 7' immediately before the unit case is brought into the state of storage, with the result that the protuberance 7a will assume the position ready for entrance into the engaging recess 6. Thus, a subsequent push given to the unit case enables the protuberance 7a to enter the engaging recess. When the protuberance 7a arrives at the rearmost portion of the engaging recess, the engaging plate 7 is moved back to its original condition by the resilience of the spring 7'. Thus, the unit case is prevented from further advancing and is retained in the state of storage.

The other end of the engaging plate 7 is extended through the notch formed in the lower end of one of the partition or side walls 3 and protruded into a space 8 enclosed with that partition wall and the lateral wall of the housing opposed to that partition wall. In the lower portion of the outer surface of that partition wall, a release lever 9 having an operating end thereof extending out of the front side of the housing is retained so as to be freely moved in the forward and rearward directions and this release lever 9 is kept drawn toward the front side with a spring 9'. The release lever has its inner end engaged with an oblique cam hole 7b formed at the other end of the engaging plate 7. When the release lever 9 is pushed in against the resilience of the spring 9' (in the direction indicated by the arrow in FIG. 1), therefore, the inner end of the release lever comes into sliding contact with the cam hole 7b and urges the engaging plate 7 against the resilience of the spring 7', forces the protuberance 7a out of the laterally disposed portion at the rearmost portion of the engaging recess, and causes the engaging plate to release the unit case.

In this embodiment of the invention, the damper device is utilized for enabling the unit case which has been released as described above to be pushed out of the front side of the housing at a reduced speed and, when the unit case thus taken out is pushed into the housing and stored therein again, enabling the unit case to be moved in without requiring any appreciable force.

For this purpose, sliders 10 are straddled movably in the forward and rearward directions on the rails 4 in the spaced lateral side partition walls 3 of housing 2 which accepts the unit case 1. The sliders 10 are capable of abutting upon the upper portion of the rear edge of the unit case and they are connected respectively to drawing springs 11 having one side ends thereof fastened to the forward ends of the lateral side partition walls. When the unit case 1 is pushed in for storage, therefore, the sliders 10 simultaneously move rearwardly on the rails and stretch the drawing springs 11. When the release lever 9 is pushed in and the engaging plate is caused to release the unit case 1 as described above, the sliders 10 are allowed by the resilient contracting force of the drawing springs 11 to move along the rails toward the open end of chamber 2a while urging the unit case from behind until the unit case is pushed out of the front side of the housing. When the door 2' keeps the front side of the storage chamber 2a closed, it must be opened before the release lever 9 is activated by being pushed into the housing.

In the lower portions on the opposed inner sides of each of the lateral partition walls 3, rack gears 12 are disposed in the direction of the travel of the unit case within the housing. From the sliders 10, the dampers 13 are swingably hung down in pivoted cantilever fashion so as to be suspended along the inner sides of the partition walls. Toothed gear wheels 14 adapted to have the rotation thereof braked by the dampers are disposed at the end of the dampers are opposite their suspension axis to be diagonally engaged with the rack gears 12. The dampers 13 are each provided with a case 13a for containing oil (grease) and having the damping means and an arm 13a extending backwardly from the case toward the rear of housing, as seen in FIGS. 2 and 4. In the present embodiment, the arm 13b is supported by a holder 15 is located. A shaft 15' at the upper end of the holder 15 and is snapped into a longitudinally slotted resilient arcuate cylinder 10' disposed on the slider 10. This permits the case 13a to pivot and hang down so as to be freely swung toward the front. From the lateral side of the case 13a, there extends the shaft of a rotary gear wheel 14 which is connected to means in damper 13 adapted to have the rotation thereof braked with the oil or grease contained in the case 13a. The aforementioned toothed gear wheel 14 is fixed to this shaft. The aforementioned dampers are of the variety disclosed in Japanese Utility Model Application Disclosure No. Sho 57(1982)-8604, for example.

When the unit case 1 is pushed into the housing 2, therefore, the sliders 10 are pushed by the unit case 1 and moved backwardly on the side rails 4. The toothed wheels 14 acquire increased rotational torque or drag because the dampening means which are contained within the cases 13a are braked with the oil also contained in the cases 13a of the dampers 13. The dampers 13 hang freely rotatable about the offset shaft 15' and thereby will pivot counterclockwise about the axis of shaft 15' (as viewed in FIG. 2) when force is applied to the spur gear 14.

This rotational torque is greater than the force with which the toothed wheels of the dampers and the rack gears are engaged during the rearward motion of the sliders. As a result, during the rearward motion of the sliders, the case 13a is moved upwardly by pivoting about the offset shaft 15 and the toothed wheels and the rack gears do not constantly engage with each other. Thus, the toothed wheels 14 only intermittently contact the rack gears 12. Thus, the insertion of the unit case into the housing can be effected with force only slightly larger than needed to overcome the resilience of the drawing springs 11. This insertion is smooth because there is no need at all for the force which is required when the toothed wheels 14 having the rotation thereof braked by the dampers 13 are to be engaged with and then rotated on the rack gears 12. Conversely when the release lever 9 is pushed in and the engaging plate 7 is caused to release the unit case 1 and the sliders 10 are enabled by the resilient contracting force of the drawing springs 11 to push the unit case from behind, the toothed wheels 14 and cases 13a are pressed downwardly by gravity and clockwise rotation (as seen in FIG. 2) about pivot 15' into a wedged condition against the rack gears 12 and hence are required to rotate against the braking force of the dampers 13. Consequently, the tensile force of the tension springs 11 is damped and the unit case is gently moved out at a reduced speed.

In the present embodiment, the rails 4 serve to guide the motion both of the unit case and that of the sliders 10. Alternatively, the rails for guiding the unit case and rails for guiding the sliders may be disposed separately of each other.

Figure 5:
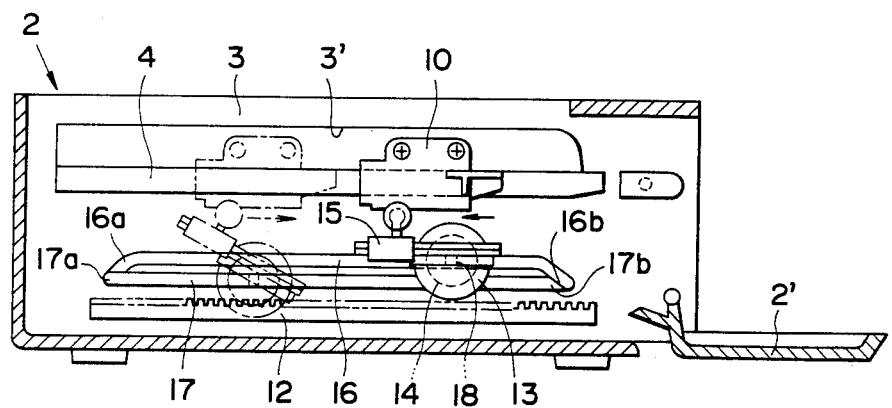
FIG. 5 is a side view illustrating a damper device as the second embodiment of this invention.
Figure 6:
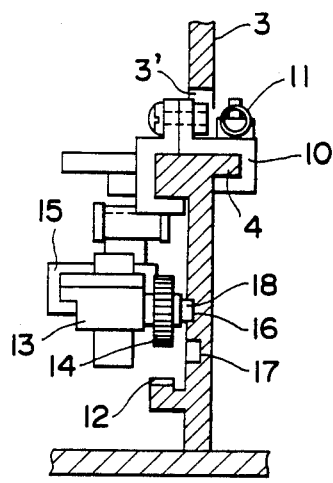
FIG. 6 is an enlarged longitudinal cross-sectional view illustrating the essential part of the damper device of FIG. 5.

In the first embodiment described above, the dampers 13 are swingably pivoted down from the sliders 10 and the toothed wheels 4 adapted to be braked by the dampers are brought into wedged contact with the rack gears downwardly in an oblique direction. Optionally, in this embodiment as seen in FIGS. 5 and 6, there are guide paths 16, 17 in the form of grooves which are disposed in the side partition walls 3 substantially parallel to the rack gears 12 in two levels, one above the other, above the rack gears 12, as seen in FIGS. 5 and 6. Opposite ends of the guide paths 16, 17 grooves communicate with each other to form a closed loop path coaxial with the toothed wheels 14, there are disposed protuberances 18 adapted to engage with the aforementioned guide paths. When the sliders are moved backwardly on the rails 4 owing to the insertion of the unit case into the housing, the protuberances 18 are caused to travel in the guide paths 16 at the upper level and the toothed wheels 14 are pivoted upwardly, as seen in solid lines to the right in FIG. 5 and are consequently released from the engagement with the rack gears 12 until the damper 13 reaches its inwardmost position at the left end of rail 4, as seen in FIG. 5, at which time the protuberance 18 drops down into path 17 and brings the toothed wheel 14 into engagement with rack. When the sliders are moved in the other direction (i.e. to the right in FIG. 5 as when they are moved forwardly by the resilient contracting force of the drawing springs 11 to push the unit case out of the housing, for example, the protuberances 18 are caused to travel in the other guide paths 17 so as to bring the toothed wheels into engagement with the rack gears 12.

Figure 7:
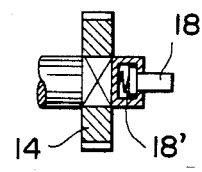
FIG. 7 is an enlarged cross-sectional view illustrating the toothed wheel of the damper in the damper device of FIG. 5.

In the second embodiment of this invention illustrated in FIGS. 5–7, the damper device is in a construction incorporating two guide paths resembling the guide paths described above. In this embodiment, these two guide paths 16, 17 are both disposed above the rack gears 12. Consequently, the protuberances 18 are caused to travel in the guide paths 16 on the upper level and separate the toothed wheels 14 from engagment with the rack gears 12 when the sliders 10 are moved backwardly owing to the insertion of the unit case into the housing. When the sliders 10 are moved forwardly to push the unit case 1 out of the housing, the protuberances 18 are caused to travel in the guide paths 17 on the lower level and bring the toothed wheels 14 into engagement with the rack gears 12. Optionally, these two guide paths 16, 17 may be disposed below the rack gears 12. In this case, the rack gears 12 are required to have their teeth formed on the lower sides thereof. The guide paths 17 on the upper level are used for guiding the toothed wheels 14 into engagement with the rack gears 12 and the guide paths 16 on the lower level are used for separating the toothed wheels 14 from engagement with the rack gears 12.

No matter whether the guide paths are both disposed above or below the rack gears, the guide paths 17 serving to guide the toothed wheels into engagement with the rack gears are required to lie parallelly to the rack gears and the other guide paths 16 are required to have the opposite end parts 16a, 16b bent toward the opposite end parts 17a, 17b of the guide paths 17 and made to communicate with each other. Desirably, the protuberances 18 are kept pressed such as with compressor springs 18' in the direction of their protrusion, as seen in FIG. 7. It is further desirable to give a greater depth to the end parts 17a of the guide paths 17 than to the end parts 16a, give a greater depth to the end parts 17b of the guide paths 17 and the end parts 16b of the guide paths 16 than to the guide paths 17. Preferably, the grooves forming guide paths 16 have a depth which gradually decreases in the direction from the end parts 16b to the end parts 16a and the grooves of guide paths 17 have a depth which gradually decreases in the direction from the end parts 17a to the points short of reaching the end parts 17b. This provides means to avoid the possibility that the protuberances 18 which have moved backwardly in the guide paths 16 and eventually departed from the interiors of the end parts 16a and entered the end parts of the guide paths 17, would during the initial stage of the subsequent withdrawal of the unit case 1, again enter the end parts 16a of the guide paths 16 and then move on forwardly in the guide paths 16. Similarly, this configuration of the groove paths 16 and 17 will avoid the possibility that the protuberances 18 which have moved forwardly in the guide paths 17 and eventually entered the other end parts 17b would, during the initial stage of the subsequent insertion of the unit case 1, advance backwardly in the guide paths 17 by mistake instead of entering the other end parts 16b of the guide paths 16.

When necessary, the dampers 13 may be kept depressed lightly with springs, not shown, that would bear against case 13a at its end opposite to pivot 10' (15'), so that when the protuberances 18 move in the guide paths 17 and bring the toothed wheels 14 into engagement with the rack gears 12, the dampers thus depressed will assure safe establishment of this engagement.

In the second embodiment of this invention, since the toothed wheels 14 are kept from contact with the rack gears 12 during the travel of the protuberances in the guide paths 16, this embodiment enjoys the advantage that it eliminates the sound otherwise possibly generated when the toothed wheels were dragged in semi-bouncing fashion on the rack gears as occurs in the first embodiment of FIGS. 1–4. It also reduces the possible wear and breakage of the teeth of the toothed wheels and rack gears.

Figure 8:
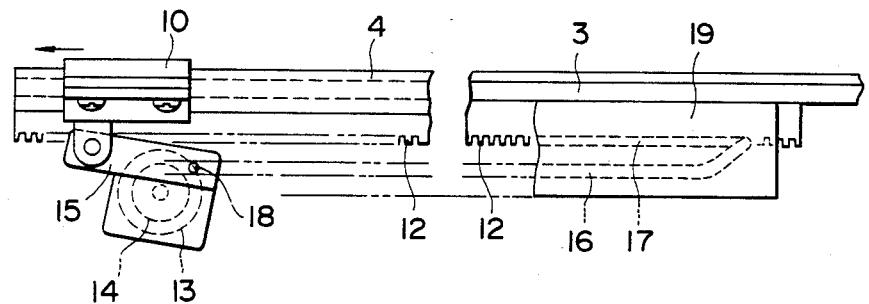
FIG. 8 is a plan view illustrating the essential part of a damper device as the third embodiment of this invention.
Figure 9:
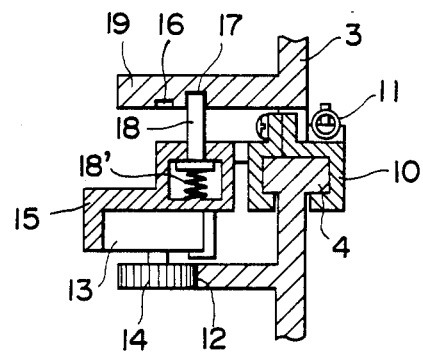
FIG. 9 is an enlarged longitudinal cross-sectional view illustrating the damper device of FIG. 8.

The third embodiment illustrated in FIGS. 8–9 is a modification of the embodiment of FIGS. 5–7. While the guide paths 16, 17 are formed in the inner sides of the lateral partition walls 3 in the embodiment of FIGS. 5–7, in this third embodiment the are formed in flange-like pieces 19 extending inwardly from the inner sides of the partition walls 3. The teeth of the rack gears 12 also extend inwardly toward each other while the dampers 13 and the toothed wheels 14 have their axes in vertical directions. Desirably, the holders 15 are pivotally attached to the sliders so as to be rotated in a horizontal plane, the dampers are fastened to the lower sides of the holders 15, and the protuberances 18 extend from the upper sides of the holders 15, with the upper free ends of the protuberances resiliently thrust into the two guide paths 16, 17. Of course, the guide paths 17 which are closer to the partition walls 3 are the ones for guiding the toothed wheels 14 into engagement with the rack gears 12. The protuberances 18 are kept engaged in the paths by the compression springs 18'. At the same time, the end parts of the two guide paths are given varied depths so as to preclude otherwise possible misoperation of the protuberances at the time that the direction of their travel is reversed.

Thus in accordance with this invention, the damper device enjoys a peculiar function such that when the sliders move on the rails in one direction, the toothed wheels having the rotation thereof braked by the dampers are meshed with the rack gears and are therefore caused to move at a reduced speed and, when the sliders move in the other direction, the toothed wheels are released from the engagement with the rack gears and the dampers are consequently inactivated. The damper device of this invention may be advantageously applied, for example, to the housing of a radio cassette wherein a unit case such as the electronic keyboard musical instrument is stored after the manner of a drawer in a cabinet. The damper device will enable the unit case to be gently pushed out of the housing at a reduced speed when the unit case is desired to be withdrawn and used for playback or recording. When the unit case is desired to be pushed into the housing after use, the damper will be inactivated and will consequently allow the unit case to be readily pushed in with minimal force.

The illustrative embodiment herein described have each utilized two damper devices on opposite side edges. In the event a unit case to be stored in or withdrawn from the housing is small in size and light in weight, however, a single damper system of the type described may suffice.

What is claimed is:

1. A damper device, comprising:
   a slider capable of reciprocating along a rail,
   a rack gear disposed below said rail paralllelly thereto,
   a damper suspended swingably from said slider said damper including a case having internal damping means connected to a shaft projecting through said case and a toothed wheel mounted on said shaft and adapted to be meshed with said rack gear when said damper is swung into a predetermined position, and
   means for causing said toothed wheel to be positively engaged with said rack gear in wedge-like relationship when said slider moves in one direction and pushes said damper from behind and swinging said damper into said predetermined position and releasing said toothed wheel from positive engagement with said rack gear by swinging said damper away from said rack when said slider moves in the opposite direction and drags said damper behind in impositive engagement.

2. A damper device according to claim 1, wherein said means for releasing said toothed wheel from engagement with said rack gear resides in allowing said toothed wheel to acquire rotational torque greater in magnitude than the force necessary for permitting said toothed wheel and said rack gear to remain in mutual engagement without imposition of an additional external force.

3. A damper device comprising:
   a slider capable of reciprocating along a rail,
   a rack gear disposed on a partition wall parallelly to said rail,
   guide paths formed by grooves disposed in two levels on said partition wall parallelly to said rack gear, with the opposite end parts thereof made to communicate with each other,
   a damper swingably disposed on said slider and provided on the lateral side thereof with a toothed wheel adapted to be meshed with said rack gear, and
   a protuberance provided on said damper and adapted to be guided by said grooves forming said guide paths, whereby said protuberance is guided by the groove at one level to bring said gear toothed wheel of said damper into engagement with said rack gear when said slider moves in one direction and said protuberance is guided by the guide path grooves in the other level to elevate said gear toothed wheel into a position away from engagement with said rack gear when said slider moves in the other direction.

4. A damper device according to claim 3, wherein the guide paths in the two levels are disposed parallelly to each other above said rack gear.

5. A damper device according to claim 3, wherein said partition wall is provided on the surface thereof with a laterally extending flange means and said parallel grooves forming said guide paths are formed in said flange means.

6. A damper device according to claim 3, wherein said protuberance is spring loaded to ensure its penetration into and maintenance of maximum engagement with the grooved guide path during its operation.

7. A damper device according to claim 3, wherein said two groove means forming said guide paths have varying depths primarily adjacent the end parts that communicate with one another thereby to insure a unidirectional movement along said guide path loop formed by said groove means by said protuberance when said slider is moved along said rails.

* * * * *